(12) United States Patent
Borntraeger et al.

(10) Patent No.: US 11,675,899 B2
(45) Date of Patent: Jun. 13, 2023

(54) HARDWARE MITIGATION FOR SPECTRE AND MELTDOWN-LIKE ATTACKS

(71) Applicant: International Business Machines Corporation, Armonk, NY (US)

(72) Inventors: Christian Borntraeger, Stuttgart (DE); Jonathan D. Bradbury, Poughkeepsie, NY (US); Martin Recktenwald, Schoenaich (DE); Anthony Saporito, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 17/121,848

(22) Filed: Dec. 15, 2020

(65) Prior Publication Data

US 2022/0188412 A1   Jun. 16, 2022

(51) Int. Cl.
  *G06F 21/55* (2013.01)
  *G06F 9/38* (2018.01)
  *G06F 9/30* (2018.01)

(52) U.S. Cl.
  CPC ........ *G06F 21/554* (2013.01); *G06F 9/30098* (2013.01); *G06F 9/3818* (2013.01); *G06F 9/3846* (2013.01); *G06F 2221/034* (2013.01)

(58) Field of Classification Search
  CPC .. G06F 21/554; G06F 9/30098; G06F 9/3818; G06F 9/3846; G06F 2221/034
  See application file for complete search history.

(56) References Cited

U.S. PATENT DOCUMENTS

| 8,627,131 | B2 | 1/2014 | Gunnam |
| 8,781,111 | B2 | 7/2014 | Qi et al. |
| 10,049,211 | B1 | 8/2018 | Lukacs et al. |
| 10,956,157 | B1* | 3/2021 | Kaplan ................ G06F 9/3838 |
| 11,294,828 | B2* | 4/2022 | Lee ......................... G06F 12/12 |

(Continued)

OTHER PUBLICATIONS

Barberis et al. "Branch History Injection: On the Effectiveness of Hardware Mitigations Against Cross-Privilege Spectre-v2 Attacks." 31st USENIX Security Symposium. Aug. 2020, p. 1481-1498 (Year: 2020).*

Sabbagh et al. "Scadet: Aside-channel attack detection tool fortracking prime-probe." 2018 IEEE/ACM International Conference on Computer-Aided Design (ICCAD). Nov. 2018, p. 1-8 (Year: 2018).*

(Continued)

*Primary Examiner* — Chau Le
*Assistant Examiner* — Zhe Liu
(74) *Attorney, Agent, or Firm* — Cantor Colburn LLP; Edward Wixted

(57) ABSTRACT

Aspects include circuitry that includes a first global generation counter (GGC) that is increased upon decoding of a branch instruction and a second GGC that is increased upon a completion of the branch instruction. Upon a triggered rollback, the first GGC is reset. The circuitry also includes a generation tag memory associated with a register that receives loads during a side-channel attacks which is set to the first GGC upon a first load, and a determination unit to determine, for a second load from an address depending on the register of the first load, a generation tag value associated with the register of the second load as a function of the first GGC, the second GGC, and the generation tag value associated with the register of the first load. A wait queue is configured to block the second load, if the generation tag is larger than the second GGC.

20 Claims, 6 Drawing Sheets

(56) References Cited

U.S. PATENT DOCUMENTS

| | | | | |
|---|---|---|---|---|
| 2011/0219208 | A1* | 9/2011 | Asaad | G06F 9/06 |
| | | | | 712/12 |
| 2019/0004961 | A1 | 1/2019 | Boggs et al. | |
| 2019/0042263 | A1 | 2/2019 | Sukhomlinov et al. | |
| 2019/0042740 | A1 | 2/2019 | Sherman et al. | |
| 2019/0050230 | A1 | 2/2019 | Branco et al. | |
| 2019/0339977 | A1* | 11/2019 | Wallach | G06F 9/30192 |
| 2020/0210070 | A1 | 7/2020 | Durham | |
| 2020/0272474 | A1* | 8/2020 | Gabor | G06F 9/30043 |
| 2020/0341900 | A1* | 10/2020 | Sandberg | G06F 12/0864 |
| 2020/0409868 | A1* | 12/2020 | Durham | G06F 12/1009 |
| 2020/0410094 | A1* | 12/2020 | Liu | G06F 9/30043 |
| 2021/0342152 | A1* | 11/2021 | Horsnell | G06F 9/3004 |
| 2021/0365554 | A1* | 11/2021 | Sakalis | G06F 21/554 |
| 2022/0067155 | A1* | 3/2022 | Favor | G06F 21/556 |
| 2022/0292183 | A1* | 9/2022 | Solomatnikov | G06F 9/30116 |
| 2022/0300610 | A1* | 9/2022 | Mendelson | G06F 12/0875 |

OTHER PUBLICATIONS

Bilal Ali Ahmad, "Real time Detection of Spectre and Meltdown Attacks Using Machine Learning", https://arxiv.org/pdf/2006.01442.pdf, arXiv, Jun. 2, 2020, 16 pages.

Chris Stevens et al., "Meltdown and Spectre: Exploits and Mitigation Strategies," https://databricks.com/blog/2018/01/16/meltdown-and-spectre-exploits-and-mitigation-strategies.html, dataBricks, Jan. 16, 2018, 9 pages.

Disclosed Anonymously, "Method and Apparatus for Preventing Side Channel Attack on Memory System and Sensitive Registers of SoC", IP.com No. IPCOM000250953D, Published Date: Sep. 18, 2017, 7 pages.

Pete Markowsky et al., "Detecting Meltdown and Spectre by Detecting Cache Side Channels," https://capsule8.com/blog/detecting-meltdown-spectre-detecting-cache-side-channels/, CapsuleS, Jul. 30, 2020, 10 pages.

International Search Report and Written Opinion for International Application No. PCT/CN2021/126226; International Filing Date: Oct. 26, 2021; dated Jan. 26, 2022; 9 pages.

* cited by examiner

|  | GC_DECODE | GC_COMPLETE | GT_REG0 | GT_REG1 | GT_REG2 | GT_REG3 | |
|---|---|---|---|---|---|---|---|
| <init> | 0 | 0 | 0 | 0 | 0 | 0 | |
| Load R1[R2] | . | . | 0 | . | . | . | |
| Branch | 1 | . | . | . | . | . | |
| Br complete | . | 1 | . | . | . | . | |
| Load R2[R1] | . | . | . | 1 | . | . | (rule 1) |
| Load R3[R2] | . | . | . | . | 1 | . | (rule 1) |
| Load R4[R3] | . | . | . | . | . | 1 | (rule 1) |

FIG. 4

HARDWARE MITIGATION FOR SPECTRE AND MELTDOWN-LIKE ATTACKS

BACKGROUND

The present invention relates generally to computer processing, and more specifically, to blocking side-channel attacks against processors.

Processor design for modern information technology (IT) infrastructures is a science and an art at the same time. The complexity of the processors is ever increasing with decreasing structure size. On the other hand, cyber security attacks on IT infrastructures that aim to simply steal data or to impair the functioning of computer systems as a whole are also booming. One of the highly sophisticated attacks may be directed against the internal functioning of processors, in particular, out-of-order (OoO) processors in which machine instructions are not executed in the way they have been programmed or in a way the compiler has optimized their flow. Instead, OoO processors also optimize the sequence of instructions on a hardware level for even better performance.

One of these hardware level optimization techniques is related to branch predictions. In some OoO processors the front end (i.e., the incoming stream of instructions) as well as the back end (i.e., the finally resulting string of instructions) are executed in order, whereas the execution of the instructions themselves between the front end and the back-end may be executed out of order. Everything in the back end is serialized again, checked for dependencies and committed or rolled back. Thus, the rollback is only for an architecture state of the processor (i.e., registers and memory content). The rollback does not affect micro-architecture states such as caches and translation lookaside buffers (TLBs). This optimization technique may allow increasing the performance of modern central processing units (CPUs) even more, but it may also open a gate for an attack to the micro-architecture states.

Meltdown and Spectre are two types of attacks which have occurred in recent years. The Meltdown attack violates the basic assumption of operating system security, namely, that an application running in user space cannot access kernel memory. This may be important because kernel memory may include sensitive information from another application, like a password. To enforce this access restriction, operating systems use page tables to divide virtual memory into sections—one for the kernel and another for un-trusted user mode applications. The kernel then depends on the processor to allow the more privileged kernel to access both sections, while restricting user applications to the user portion. It turns out that certain processors do not hold up this restriction. A Meltdown attack can occur when OoO execution leaks kernel memory into user mode long enough for it to be captured by a side-channel cache attack.

Spectre, on the other hand, is a class of exploits, two of which have been discovered, where an attacking application primes the branch predictor cache in order to cause a victim application to speculatively execute malicious code paths. Speculative execution has a special type of OoO execution making Spectre similar to Meltdown. This malicious code path's execution gets rolled back, but it leaves metadata behind in the cache that is available to a possible side-channel attack. Side-channel attacks can leak some information depending on timing or other means that go beyond the architectural state. Changes to application code may be implemented in an attempt to defend against potential security breaches caused by Meltdown and Spectre attacks, however such changes can be expensive and unreliable.

SUMMARY

Embodiments of the present invention are directed to blocking a side-channel attack against a processor. A non-limiting example system includes processing circuitry that includes a first global generation counter (GGC) that is increased upon each decoding and predicting of a branch type instruction, and a second GGC that is increased upon every completion of a branch type instruction. The first GCC counter is configured to be reset upon a triggered rollback to the value of the second GCC. The circuitry also includes at least one generation tag memory each associated with a register of at least one register on the processor that receives loads during side-channel attacks. Each of the generation tag memories is configured to store a generation tag value associated with a register. Each of the at least one generation tag memory is configured to be set to the value of the first global generation counter upon a first load into its associated register. The circuitry also includes a determination unit that is configured to determine, for a second load of a register of the at least one register that is loaded from an address that depends on the value of the register of the first load, the generation tag value associated with the register of the second load. The generation tag value of the second load is a function of a value of the first global generation counter, a value of the second global generation counter, and the register generation tag value associated with the register of the first load. The circuitry also includes a wait queue that is configured to block the second load if the determined generation tag value is more than one generation ahead of the value of the second global generation counter.

Other embodiments of the present invention implement features of the above-described system in computer-implemented methods and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 shows a diagram of an example of blocking a side-channel attack against a processor according to one or more embodiments of the present invention;

DETAILED DESCRIPTION

Figure 1:
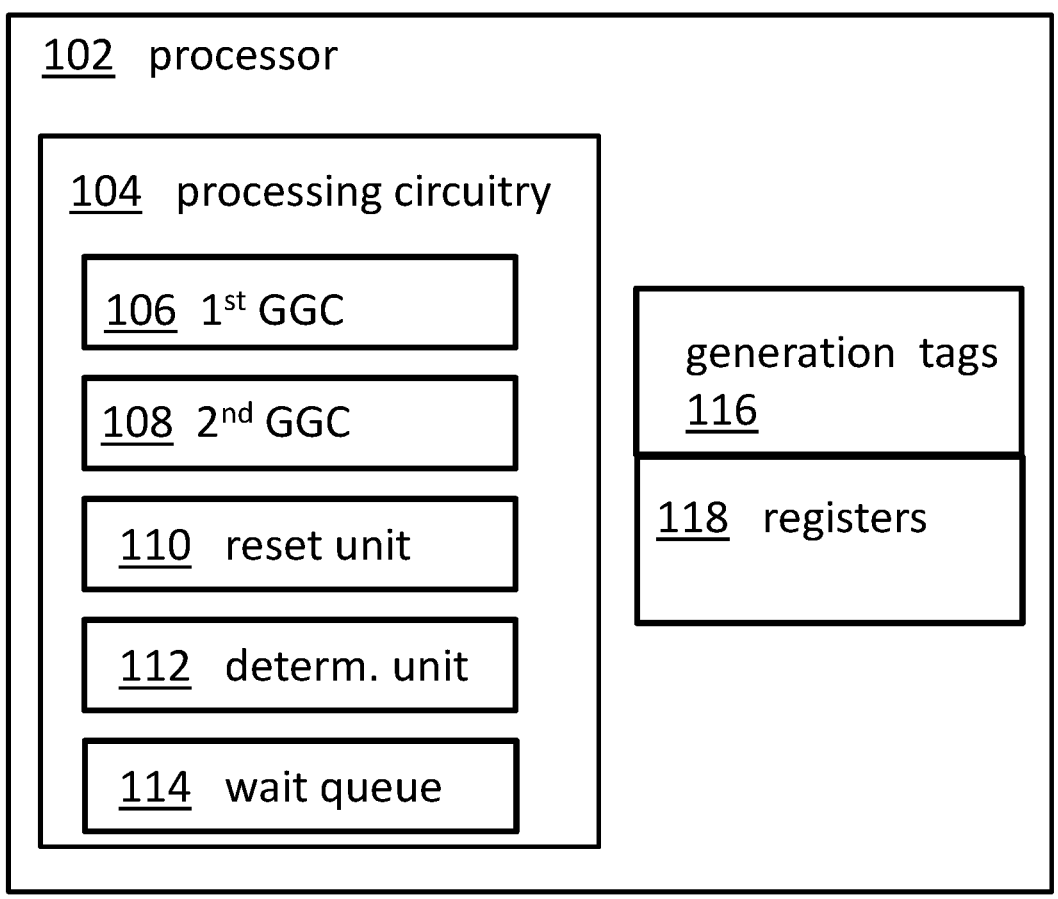
FIG. 1 shows a block diagram of an embodiment of processing circuitry for blocking a side-channel attack against a processor according to one or more embodiments of the present invention.

One or more embodiments of the present invention are directed to blocking side-channel attacks against processors.

A used herein, the term "blocking" refers to an instruction that is not forwarded by the instruction wait queue of a processor to an execution unit of a related register in an out-of-order (OoO) manner. Instead, the blocking may remain active until conditions are achieved so that the instruction is executed in an in-order manner or alternatively in a "lesser" OoO manner, for example one instruction will enter the OoO area at a later point in time as soon as the conditions are met.

As used herein, the term "side-channel attack" refers to an un-allowed or improper access to memory or other data by a specific form of malware in computer systems. A side-channel attack may go after data that is still in memory places where it should not remain. For example, the attack may occur when a speculative load is dependent on a previous speculative load that has a malicious process-controlled address which is outside of valid check range for memory address.

As used herein, the term "register" refers to the well-known processor core internal storage in which instructions and data are stored to become an element of an execution by one of the execution units As used herein, the term "load" refers to data and/or an instruction that are stored in a register.

As used herein, the term "first global generation counter" refers to a newly introduced element in the processor core having a value that may be increased each time that a branch-type instruction is decoded by an instruction/data decoder of the processor.

As used herein, the term "prediction" refers to a branch predictor that may try to guess which way a branch instruction (e.g., an if-then-else or conditional jump) may go, or the address of the target of the branch before it is definitely known. The purpose of the branch predictor is to improve the flow of the instruction pipeline in order to increase the performance of the processor.

As used herein, the term "branch-type instruction" refers to, but is not limited to, an if-then-else instruction or a conditional jump instruction.

As used herein, the term "triggered rollback" refers to not using the results of already executed instructions in a predicted branch path because of a finally known wrong prediction.

As used herein, the term "generation tag memory" refers to a storage closely related to a register enabled to store a counter value, namely, the generation tag value.

As used herein, the term "first load" may refer to a first indirect load to a first register.

As used herein, the term "second load" may refer to a second indirect load to a second register. In some cases, the first and the second registers may be the same.

As used herein, the term "wait queue" refers to the well-known element of a processor in which it is decided in which order incoming instructions are executed. The wait queue may decide to send data and instructions to registers and execution units for an OoO execution, or in accordance with one or more embodiments of the present invention may make the OoO execution impossible and enforce an in-order execution or delay the OoO execution to a later point in time when all conditions are met.

As used herein, the term "one generation ahead" refers to a situation in which the stored generation tag value of a register to be loaded is larger than the second global generation counter ("GC_COMPLETE").

As used herein, the term "flush of a cache" refers to the content of a cache memory being declared invalid because of the fact that other data are actually required from the main memory in the cache.

As used herein, the term "immediate load" refers to a direct load of a register with a certain value.

As used herein, the term "indirect load" or "relative load" refers to a register is loaded with a value to that depends on the address of the load instruction (the value is relative to the instruction address).

As used herein, the term "load-and-store unit" refers to a specialized execution unit that is responsible for executing load and store instructions, generating virtual addresses of load and store operations and loading data from memory/cache memory or storing it back to memory/cache memory from registers.

One or more embodiments of the present invention provide for blocking a side-channel attack against the processor which provides multiple advantages and technical effects:

In general, side-channel attacks to modern central processing units (CPUs), in particular, to those operating according to the OoO paradigm, may be blocked and/or avoided altogether by one or more embodiments of the present invention. One or more embodiments may also avoid application software, middleware software, and/or operating system software changes to address the potential side-channel attack.

One interesting aspect of these side-channel attacks has been that speculation of a second load may use the value of a previous already speculative first load as part of the address for the second load. In other words, to exploit Spectre or Meltdown one may need a speculative dependent load of a speculative load that may have an attacker-controlled address. One or more embodiments of the present invention go beyond contemporary circumventions like an OoO barrier at a branch point which results in the following loads not being speculative. However, such a solution may decrease the performance of the processor significantly.

The performance impact of one or more embodiments of the present invention is minimal as it only delays affected instructions, while every other instruction can be executed with the normal OoO scheme as in unprotected processors.

One or more embodiments of the present invention also make other countermeasures superfluous, such as a construction of a data dependency out of the control dependency, or a means to slow down the branch operation and/or global branch prediction barriers, or tagging which may only help against a subset of the currently known side-channel attacks (e.g., Spectre 2).

In accordance with one or more embodiments of the present invention, software changes to already existing applications or other programs and/or compiler optimization routines are not required at all.

Another benefit of one or more embodiments of the present invention is that the total amount of extra hardware (logic gates and registers) is low enough to make it feasible as an addition to existing designs, both from an area (size) perspective, as well as a timing (processor frequency) perspective. This may allow an implementation without having to compromise on general processor performance even if the new feature is not being used.

According to one useful embodiment of the processing circuitry, the processor may include at least one of a central processing unit, a core of a CPU, and a thread of a core of the processor. In all these units, speculated branch predictions may be possible and may be executed, thus, being a potential victim of a side-channel attack.

According to an embodiment of the present invention, the rollback may be triggered upon one of the events selected out of the group consisting of a misprediction of the branch type instruction, a restart of a pipeline in the processor, and a flush of a cache of the processor. All of these trigger events may occur in a modern CPU due to its efficiency. However, one or more embodiments of the present invention may allow these trigger events for rollbacks and also prevent side-channel attacks.

According to an embodiment of the present invention, all values of the generation tag memories associated with registers involved in one of the trigger events may be set to the second global generation counter upon the triggered rollback. This aspect will be more detailed in reference to Rule 6 below.

According to one or more embodiments of the present invention, the first load may be an immediate load or a relative load. The first load may not be controllable by a side-channel attack and is therefore not vulnerable by the malicious process. Thus, the type of load instruction does not really matter.

According to one or more embodiments of the present invention, the determination unit may be part of a load-and-store unit of the processor. This may be a natural location in the architecture of an OoO processor because all relevant statuses required for the proposed concept may be present in the load-and-store unit of the processor.

According to one or more embodiments of the present invention, the register of the first load is identical to the register of the second load. This may be a requirement for the Spectre and Meltdown type attacks to OoO processors. Hence, one or more embodiments may address exactly this security hole, making rendering Spectre and Meltdown type attacks impossible by hardware processor-internal countermeasures.

According to one or more embodiments of the present invention, the blocking may be further dependent on whether data for the second load may be in the cache of the processor. If the data are already in the cache, no side-channel attack may be possible. Thus, malicious instructions may not be "smuggled" into the cache memory by the side-channel attack.

According to one or more embodiments of the present invention, a dependency according to the function is at least one of the following: if the value of the first global generation counter is equal to the value of the second global generation counter, then the generation tag value of the second load is set equal to the value of the second global generation counter; if the value of the first global generation counter is equal to the generation tag value of the first load, then the generation tag value of the second load is set equal to the generation tag value of the first load; and if the value of the first global generation counter is greater than the generation tag value of the first load, then the generation tag value of the second load is set equal to the generation tag value of the first load plus one.

These dependencies may allow an easy and straightforward implementation of a proposed processing circuitry and method. They are discussed further below in reference to Rules 1, 2, and 4.

In the following, a detailed description of the figures will be given. All instructions in the figures are schematic. Firstly, a block diagram of circuitry for implementing an embodiment of blocking a side-channel attack against the processor is given. Afterwards, further embodiments, as well as embodiments of the method for blocking a side-channel attack against a processor, will be described.

FIG. 1 shows a block diagram of an embodiment 100 of the processing circuitry for a processor 102, in particular, an OoO processor, for blocking a side-channel attack against the processor 102. The blocking of an instruction may result in a delay or in-order execution of the instruction by the OoO processor 102. That is, an OoO execution of the instruction is partially prevented or deferred to a later point in time. The OoO execution may relate to a speculative execution of a branch type instruction. The processor 102 includes at least one register 108, which may receive loads during the side-channel attack.

The processing circuitry 104 shown in FIG. 1 includes a first global generation counter ($1^{st}$ GGC or GC_DECODE) 106 which is increased upon each decoding and predicting of a branch-type instruction. This may also be a conditional jump instruction on entry of the OoO execution.

The processing circuitry 104 also includes a second global generation counter ($2^{nd}$ GGC or GC_COMPLETE) 108 which is increased upon every completion of a branch-type instruction. Thereby, the branch-type instruction mentioned in the context of the first load generation counter 106 is not necessarily the same branch-type instruction mentioned in the context of the second global generation counter 108. Hence, the two mentioned branch-type instructions may be different.

The first global generation counter 106 is configured to be reset by reset unit 110 upon a triggered rollback to the value of the second global generation counter, wherein the rollback may relate to the rollback of a wrongly predicted branch that is subject to or following the branch-type instruction.

The processing circuitry 104 also includes at least one generation tag memory 116 configured to store a generation tag value (GT_REGx) associated with the at least one register 118 of the processor 102. In a possible implementation, the generation tag may be implemented as a couple of extra bits for the register so that each register has its related generation tag memory 116.

Each of the at least one generation tag memory 116 is configured to be set to the value of the first global generation counter 106 upon a first load into the associated register.

Additionally, the processing circuitry 104 also includes a determination unit 112 which may be associated with the generation tag memory 116, and configured to determine, for a second load of a register of the at least one register (typically a second register (REG2) loaded from an address depending on the value of the register (REG1) of the first load), the generation tag value (GT_REG2) associated with the register (REG2) of the second load. The generated tag value is a function of a value of the first global generation counter (GC_DECODE) 106, a value of the second global generation counter (GC_COMPLETE) 108, and the register generation tag value (GT_REG1) associated with the register (REG1) of the first load.

Furthermore, the processing circuitry 104 also includes wait queue 114 which is configured to block, or reject an instruction until it can be executed, the second load (i.e., the dependent one of the two loads) as long as the determined generation tag value (GT_REGx) is more than one generation ahead of (i.e., greater than) the value of the second global generation counter (GC_COMPLETE) 108.

Thus, one or more embodiments of the present invention are based on the idea that a full OoO speculation is allowed for most instructions and at least one level of speculation for loads by blocking a speculated dependent load for speculative loads with a tagging based on global generation counters.

Before turning to a description of the next Figures, some straightforward examples follow. As a convention, the expression Rx=[Ry] means that register x is loaded from the address that depends on the content of register y.

Next, five examples are shown in which the respective accesses are ok:

Example 1: R1=[R0]; branch; R2=[R1]; since R2=[R1], is only one speculative load and not two.

Example 2: branch; R1=[relative]; R2=[R1]; R3=[R2]; with [relative] being a load which address is either absolute or relative, as R1=[relative], it does not depend on any value from before the branch.

Example 3: R1=[R0]; branch; R2=[R1$_{nospec}$]; R3=[R2]; R4=[R3]; as R2 is loaded in an unspeculative way (e.g. because the branch has already completed), the load of R3 is not speculative.

Example 4: R1=[R0]; branch; R2=[R1]; R3=[R2$_{nospec}$]; R4=[R3]; as R2 is only one speculative load, R3 is loaded unspeculative and R4 is similar to Example 3.

Example 5: R1=[R0]; branch; R2=[R1]; R3=[R1]; as R2 and R3 are independent from each other; to exploit speculation, a dependency would be necessary.

However, the following access would not be ok, e.g., potentially dangerous: R1=[R0]; branch; R2=[R1]; R3=[R2]; in this case, R3 shall have a value which is determined by the address of R2 which is in turn depends on the address of register R1. This may represent a dangerous case in the sense of a side-channel attack.

This is because an attacker wants to have a speculative load followed by a dependent speculative load (i.e., one speculative load is not enough). Therefore, one or more embodiments of the present invention has two global generation counters: one (GC_DECODE) is increased on a decode of every branch-type instruction (i.e., on an entry of an OoO processing) and another one (GC_COMPLETE) is increased in every completion of such branch-type instruction. Furthermore, one or more embodiments provide a reset of GC_DECODE to the value of GC_COMPLETE in case of a misprediction, restart, or flush of a cache.

In accordance with one or more embodiments of the present invention, a generation tag is attached to each register GT_REG and for an immediate or relative load GT_REG is set to the value of GC_DECODE. For a load of the register R2 from an address based on R1 the double dependency is tracked by calculating the registered generation tag GT_REG2 based on GC_COMPLETE and GT_REG1. Then, as an important step, loads are blocked when GT_REG is more than one generation ahead of GC_COMPLETE.

Subsequently, in accordance with one or more embodiments of the present invention six rules may be applied for loading REG2 from [REG1]:
1. if (GC_DECODE==GC_COMPLETE) then GT_REG2=GC_COMPLETE;
2. if (GC_DECODE-GT_REG1==0) then GT_REG2=GT_REG1;
3. if (GT_REG1-GC_COMPLETE>=1) then reject this operation/instruction; and
4. If (GC_DECODE-GT_REG1>0) then GT_REG2=GTREG1+1.

In addition, related rules include:
5. relative/immediate load: GT_REG2=GC_DECODE; and
6. on rollback: GT_REG0=GT_REG2 . . . =GT_REGn=GC_DECODE=GC_COMPLETE.

In accordance with one or more embodiments of the present invention, the increase of the counters as well as the addition of Rule 4 are a logical addition and thus can handle wraparounds.

The limited value range of a smaller counter (i.e., only a few bits available for the counters) can also be considered. For big enough counters (larger than an OoO window) it is known that GC_DECODE cannot wrap over GC_COMPLETE. For smaller counters one or more embodiments can block further branches before a wrap-around happens.

As a further optimization one or more embodiments of the present invention consider that for more than two loads that a blocking occurs only if not in the fastest cache, mostly the L1 (level one) cache.

Figure 2:
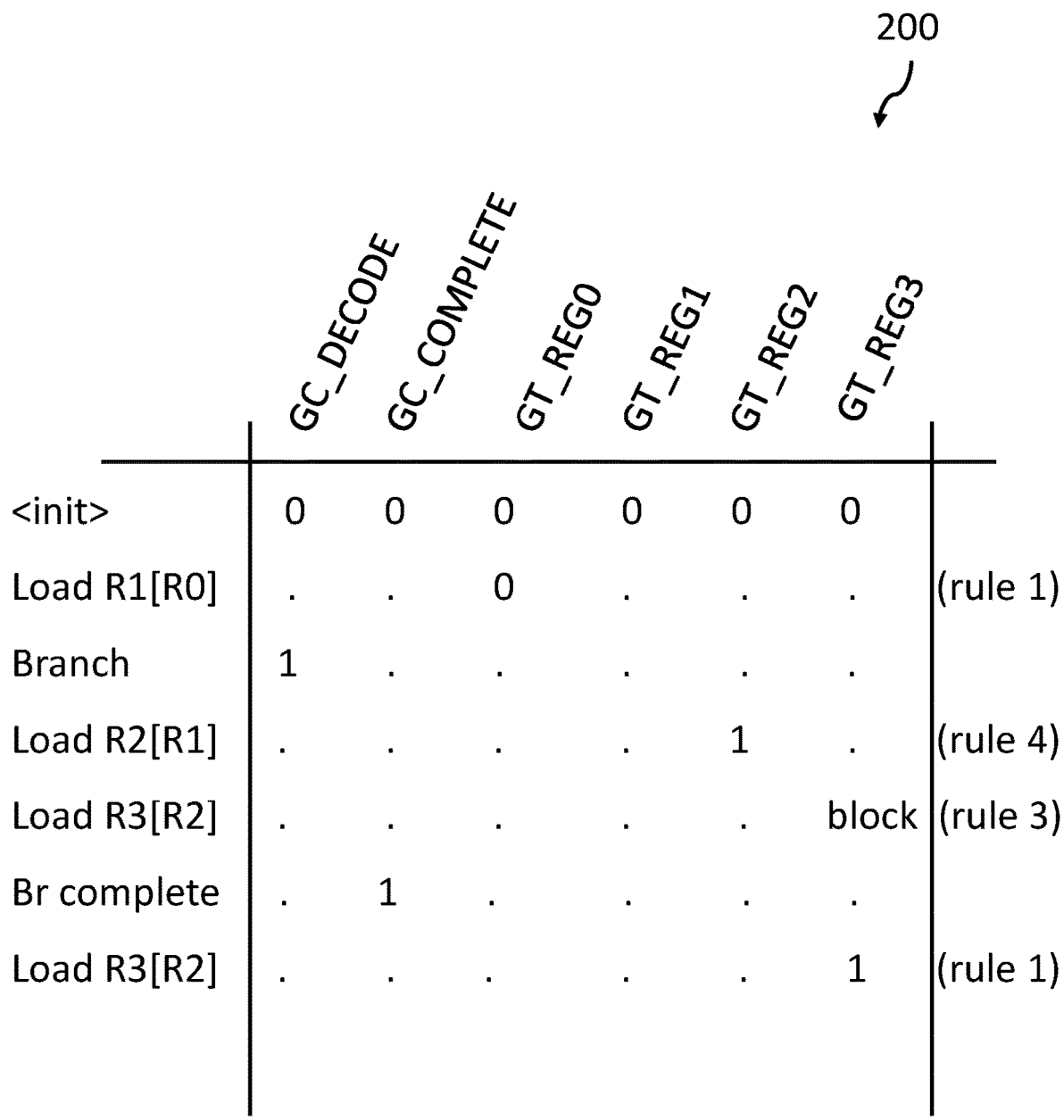
FIG. 2 shows a diagram of an example of blocking a side-channel attack against a processor according to one or more embodiments of the present invention.

Turning now to FIG. 2, a diagram 200 of an example of blocking a side-channel attack against a processor is generally shown in accordance with one or more embodiments of the present invention. Here, the following example shall be considered: R1=[R0]; branch; R2=[R1]; R3=[R2], in which the third load operation to R3 is a dangerous one.

It may also be noted for an interpretation of FIG. 2 that if a value stays the same, only a "." is shown. The other values shown are those after an update has been made by a respective instruction.

All counters are initialized "<init>" with a value of "0". As the counters will hold a size dependent range any other start value would work as well. On the left side of the table the various instructions are shown, wherein "Br complete" stands for "branch complete." The nomenclature of the loading from addresses is the same as explained above. It can be seen that after the first load R1 from the address stored in [R0] (i.e., R1[R0]), the first global generation counter (GC_DECODE) changes its value from "0" to "1" due to a branch. At the instruction load R2[R1] the generation tech counter for register 2 (GT_REG2) is set to "1". In the next step, which would mean an execution of R3[R2], this instruction would be blocked, until an execution is possible again. The term "rejection" refers to a rejection only until the blocking is released for an execution in the order of the incoming instructions.

It can also be recognized that after the branch is complete ("Br complete"), the blocked instruction R3[R2] is executed because now it is no longer blocked by the rules (see above). Hence, all instructions are executed, most of them in an OoO manner (apart from those that need to wait because of it being blocked) until instruction execution is possible again. The rules, which are indicated on the right side of the table, may be implemented using hardware elements in accordance with one or more embodiments of the present invention. Alternatively, they may also be implemented as micro-code which (unlike a hardware implementation) may have an impact on the performance.

Figure 3:
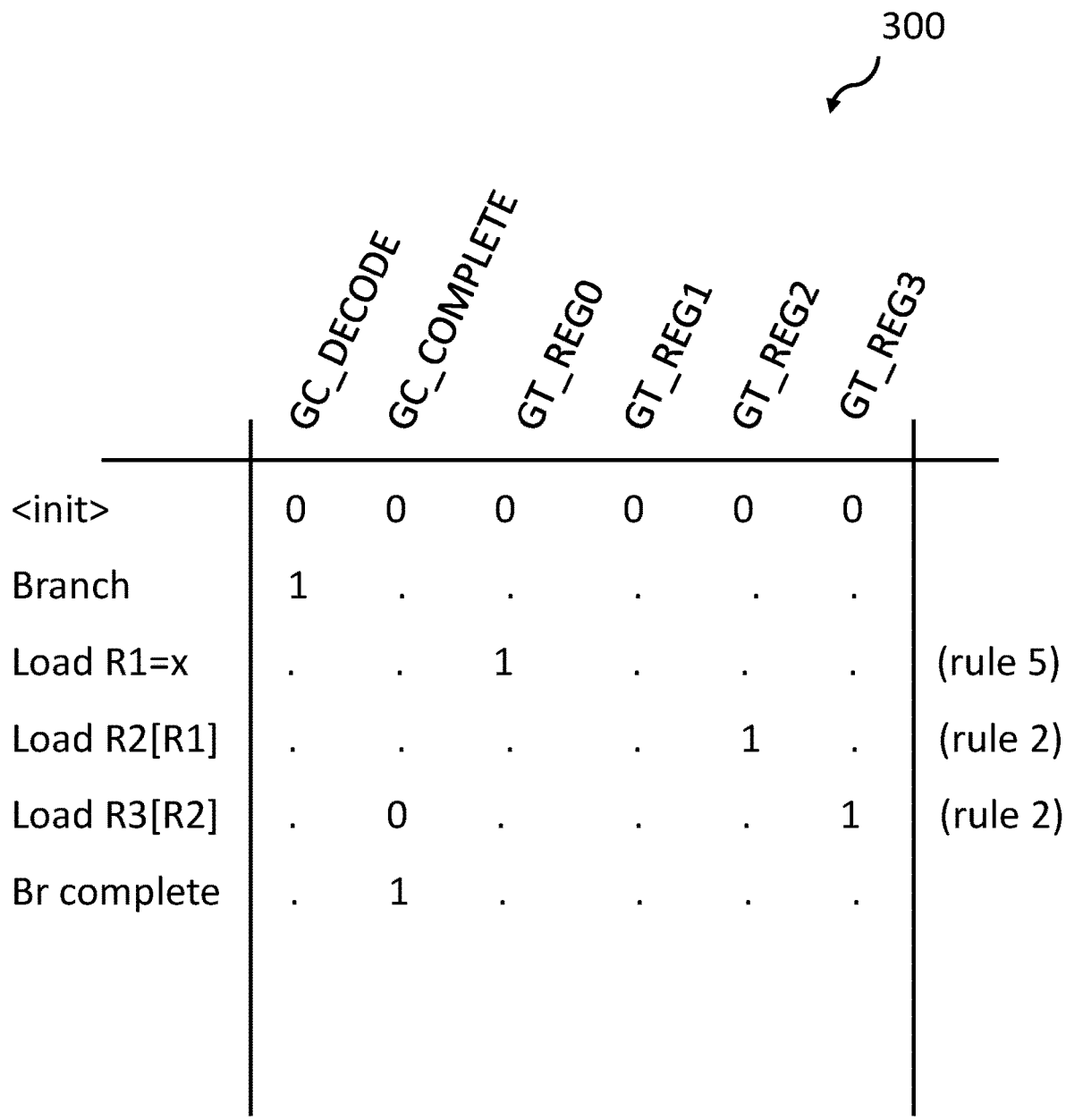
FIG. 3 shows a diagram of an example of blocking a side-channel attack against a processor according to one or more embodiments of the present invention.

Turning now to FIG. 3, a diagram 300 of another example of blocking a side-channel attack against a processor is generally shown in accordance with one or more embodiments of the present invention. The example shown in FIG. 3 includes: branch; R1=[relative]; R2=[R1]; and R3=[R2]. In this case, no blocking may be required.

Turning now to FIG. 4, a diagram 400 of another example of blocking a side-channel attack against a processor is generally shown in accordance with one or more embodiments of the present invention. The example shown in FIG. 4 includes: R1=[R0]; branch; R2=[R1$_{nospec}$]; R3=[R2]; R4= [R3]. This example does not lead to a block of one of the OoO instructions because only Rule 1 is applied.

Figure 5:
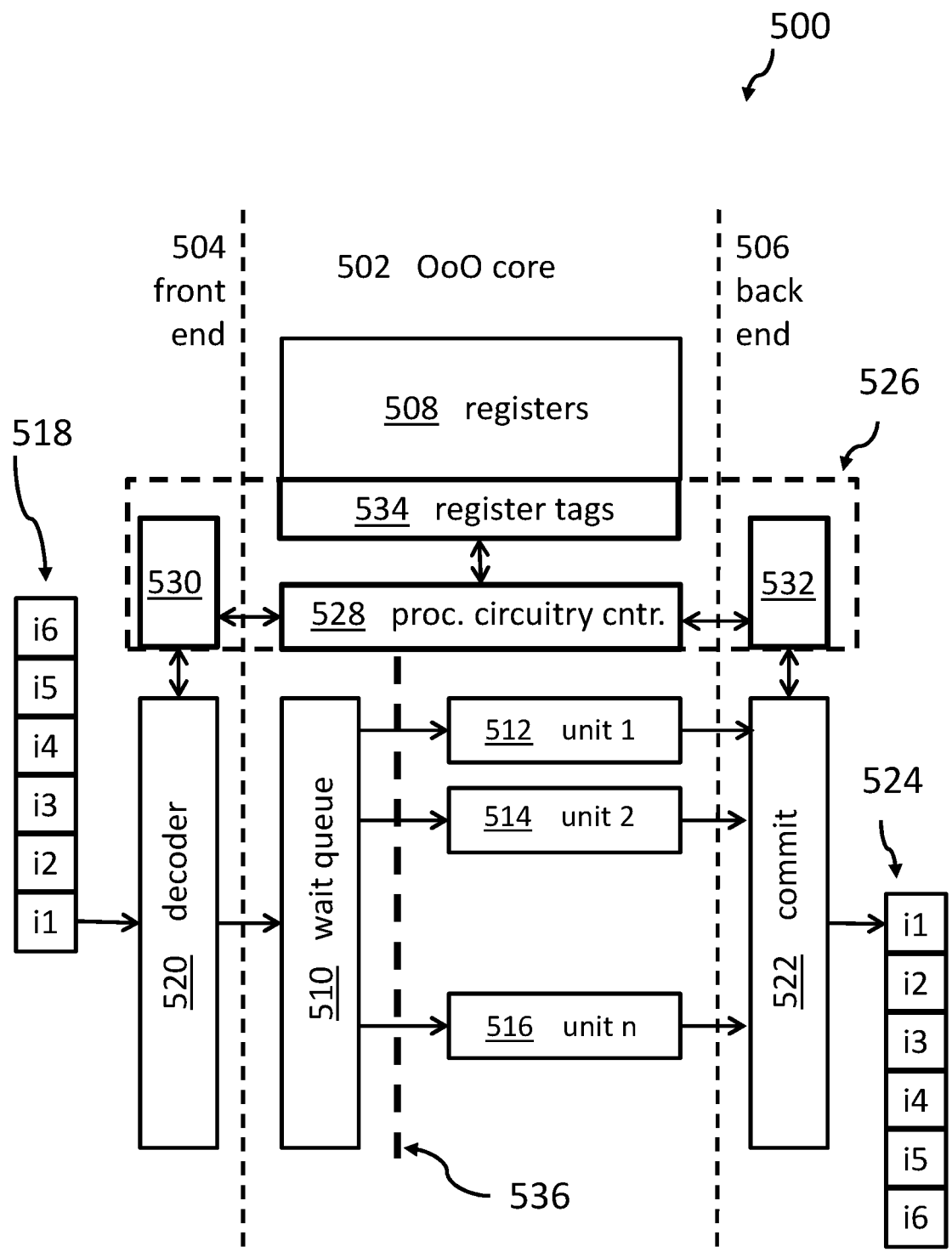
FIG. 5 shows a block diagram of an embodiment of an out-of-order (OoO) processor core according to one or more embodiments of the present invention.

Turning now to FIG. 5, a block diagram of an embodiment of an OoO processor 500 is generally shown in accordance with one or more embodiments of the present invention. The OoO processor 500 is separated into three parts by two vertical lines. The middle part comprises the OoO core 502 which has on its left side front-end units 504 of the processor 500 and on the right side back-end units 506. Elements of the core 502 of the processor 500 include at least the registers 508, and construction wait queue 510 and execution units 512, 514, . . . , 516.

Instructions 518, symbolically shown as six instructions i1, . . . , i6, which arrive at the processor 500 in order are decoded by the decoder 520 and formatted to the instruction wait queue 510. In the middle part, in the core 502, the instructions are executed in general in an OoO manner by the execution units 512, 514, . . . , 516. The instruction results are then brought again in order by the back-end units, in particular the commit unit 522. The result can be seen as the results 524 of the instructions which also are denoted symbolically as i1, . . . , i6.

In accordance with one or more embodiments of the present invention, the processing circuitry 526 includes a processing circuit controller 528, a first global generation counter 530 (CG_DECODE), a second global generation counter 532, and registered tags 534. The interdependency and interaction between these units have been described herein above.

In accordance with one or more embodiments of the present invention, by an interaction of the processing circuitry 526, in particular the processing circuitry controller 528, with the instruction wait queue 510, instructions to be executed in one of the execution units 512, 514, . . . , 516 can be controlled in a way that they are fed directly (e.g., in OoO manner) to the execution units 512, 514, . . . , 516. However, in some cases, and according to the above explained Rules 1 to 6, an immediate OoO execution can be blocked or held back until conditions are reached such that no side-channel attack is possible any longer; the point at which these conditions are reached is symbolized by the vertical line 536 in FIG. 5.

Figure 6:
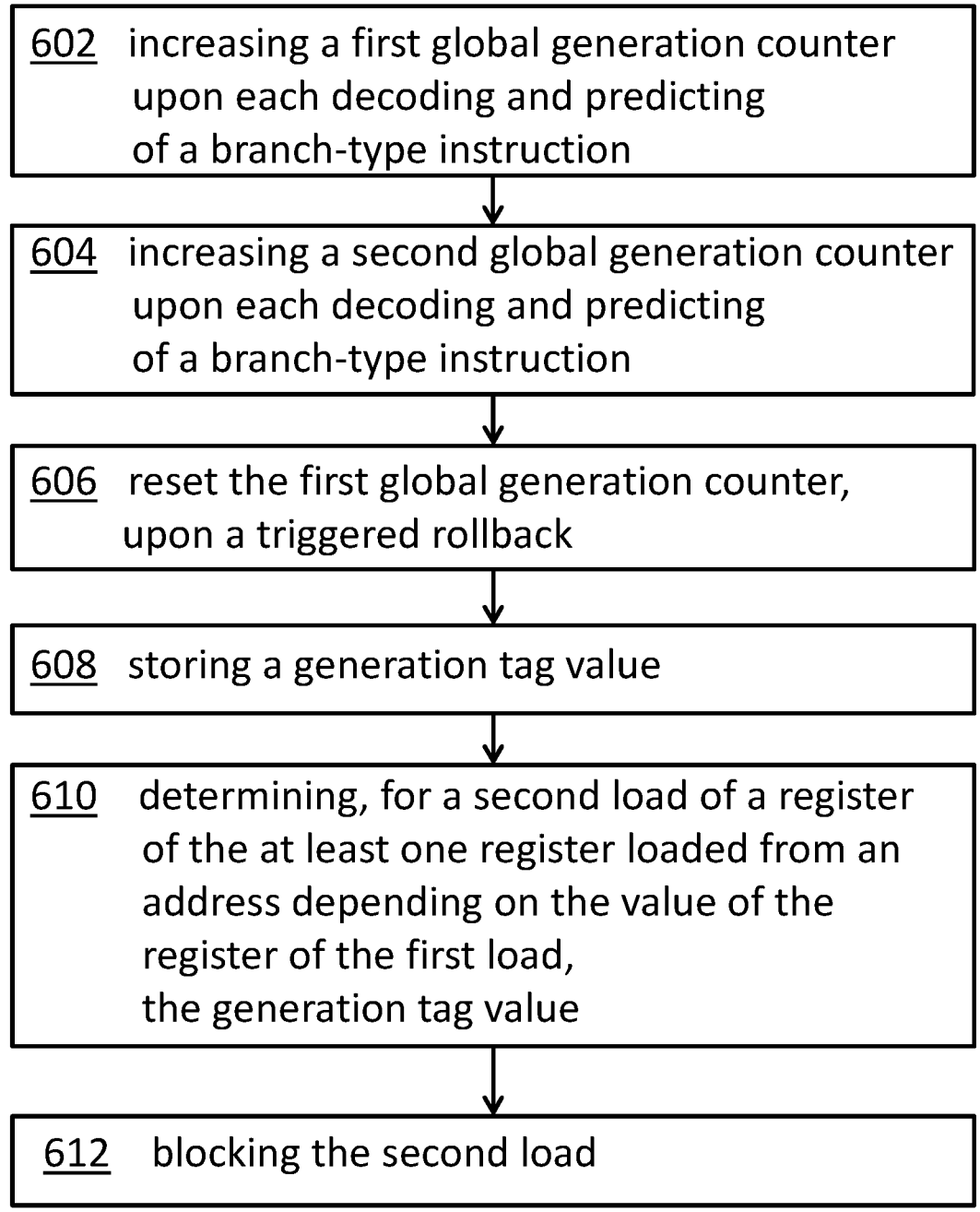
FIG. 6 shows a flowchart of a method for blocking a side-channel attack against a processor according to one or more embodiments of the present invention.

Turning now to FIG. 6, a flowchart of a method 600 for blocking a side-channel attack against a processor is generally shown in accordance with one or more embodiments of the present invention. The processor includes at least one register which receives loads of registers during the side-channel attack. The method 600 includes increasing a first global generation counter upon each decoding and predicting of a branch type instruction at block 602, and at block 604, increasing a second global generation counter upon every completion of a branch-type instruction.

At block 606, the first global generation counter is reset, upon a triggered rollback, to the value of the second global generation counter.

Processing continues at block 608 with storing a generation tag value in a generation tag memory associated with the at least one register of the processor, The generation tag value is set to the value of the first global generation counter upon a first load into the associated register. At block 610, it is determined for a second load of a register of the at least one register loaded from an address depending on the value of the register of the first load, the generation tag value associated with the register of the second load. The generation tag value is a function of a value of the first global generation counter, a value of the second global generation counter, and the register generation tag value associated with the register of the first load.

Processing continues at block 612 with blocking, by a wait queue, the second load if the determined generation tag value is more than one generation ahead of the value of the second global generation counter.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A processing circuitry for a processor for blocking a side- channel attack against said processor, said processor comprising at least one register which receives loads during said side-channel attack, said processing circuitry comprising:
    a first global generation counter which is increased upon each decoding and predicting of a first branch type instruction;
    a second global generation counter which is increased upon every completion of a second branch type instruction, wherein said first global generation counter is configured to be reset upon a triggered rollback to a value of said second global generation counter, wherein the first branch type instruction and the second branch type instruction can be a same instruction or different instructions;
    at least one generation tag memory configured to store a generation tag value associated with said at least one register of said processor, wherein each of said at least one generation tag memory is configured to be set to a value of said first global generation counter upon a first load into said associated register;
    a determination unit configured to determine, for a second load of a register of said at least one register loaded from an address depending on said value of said register of said first load, a generation tag value associated with said register of said second load, said generation tag value being a function of said value of said first global generation counter, said value of said second global generation counter, and said generation tag value associated with said register of said first load; and
    a wait queue configured to block said second load if said determined generation tag value is more than one generation ahead of said value of said second global generation counter.

2. The processing circuitry according to claim 1, wherein said processor comprises at least one of a central processing unit, a core of a central processing unit, and a thread of a core of said processor.

3. The processing circuitry according to claim 1, wherein said rollback is triggered upon one of events selected from a group consisting of a misprediction of one of the first and second branch type instructions, a restart of a pipeline in said processor, and a flush of a cache of said processor.

4. The processing circuitry according to claim 3, wherein, upon said triggered rollback, all values of said generation tag memories associated with registers involved in said one of said events are set to said second global generation counter.

5. The processing circuitry according to claim 1, wherein said first load is one of an immediate load and a relative load.

6. The processing circuitry according to claim 1, wherein said determination unit is part of a load-and-store unit of said processor.

7. The processing circuitry according to claim 1, wherein said register of said first load is identical to said register of said second load.

8. The processing circuitry according to claim 1, wherein said blocking is further dependent on whether data for said second load are in said cache of said processor.

9. The processing circuitry according to claim 1, wherein a dependency according to said function includes one of:
    if said value of said first global generation counter is equal to said value of said second global generation counter, then said generation tag value associated with said register of said second load is set equal to said value of said second global generation counter;
    if said value of said first global generation counter is equal to said generation tag value of said first load, then said generation tag value associated with said register of said second load is set equal to said generation tag value associated with said register of said first load; and
    if said value of said first global generation counter is greater than said generation tag value of said first load, then said generation tag value of said second load is set equal to said generation tag value associated with said register of said first load plus one.

10. A method for blocking a side-channel attack against a processor, said processor comprising at least one register which receives loads during said side-channel attack, said method comprising:

increasing a first global generation counter upon each decoding and predicting of a first branch type instruction;

increasing a second global generation counter upon every completion of a second branch type instruction, wherein said first global generation counter is reset, upon a triggered rollback, to a value of said second global generation counter, wherein the first branch type instruction and the second branch type instruction can be a same instruction or different instructions;

storing a generation tag value in a generation tag memory associated with said at least one register of said processor which is set to a value of said first global generation counter upon a first load into said associated register;

determining, for a second load of a register of said at least one register loaded from an address depending on said value of said register of said first load, a generation tag value associated with said register of said second load, said generation tag value being a function of said value of said first global generation counter, said value of said second global generation counter, and said generation tag value associated with said register of said first load; and blocking, by a wait queue, said second load, if said determined generation tag value is more than one generation ahead of said value of said second global generation counter.

11. The method according to claim 10, wherein said processor comprises at least one of a central processing unit, a core of a central processing unit, and a thread of a core of said processor.

12. The method according to claim 10, wherein said rollback is triggered upon one of events selected from a group consisting of a misprediction of one of the first and second branch type instructions, a restart of a pipeline in said processor, and a flush of a cache of said processor.

13. The method according to claim 12, wherein, upon said triggered rollback, all values of said generation tag memories associated with registers involved in said one of said events are set to said second global generation counter.

14. The method according to claim 10, wherein said first load is one of an immediate load and a relative load.

15. The method according to claim 10, wherein said determining is performed by a load-and-store unit of said processor.

16. The method according to claim 10, wherein said register of said first load is identical to said register of said second load.

17. The method according to claim 10, wherein said blocking is further dependent on whether data for said second load are in said cache of said processor.

18. The method according to claim 10, wherein a dependency according to said function includes one of:

if said value of said first global generation counter is equal to said value of said second global generation counter, then said generation tag value associated with said register of said second load is set equal to said value of said second global generation counter, if said value of said first global generation counter is equal to said generation tag value of said first load, then said generation tag value associated with said register of said second load is set equal to said generation tag value associated with said register of said first load, and if said value of said first global generation counter is greater than said generation tag value of said first load, then said generation tag value of said second load is set equal to said generation tag value associated with said register of said first load plus one.

19. A computer program product for blocking a side-channel attack against a processor that includes at least one register which receives loads during said side-channel attack, the computer program product comprising one or more computer-readable storage mediums having program instructions embodied therewith, the program instructions executable by one or more processors including the processor to cause the one or more processors to perform operations comprising:

increasing a first global generation counter upon each decoding and predicting of a first branch type instruction;

increasing a second global generation counter upon every completion of a second branch type instruction, wherein said first global generation counter is reset, upon a triggered rollback, to a value of said second global generation counter, wherein the first branch type instruction and the second branch type instruction can be a same instruction or different instructions;

storing a generation tag value in a generation tag memory associated with said at least one register of said processor which is set to a value of said first global generation counter upon a first load into said associated register;

determining, for a second load of a register of said at least one register loaded from an address depending on said value of said register of said first load, a generation tag value associated with said register of said second load, said generation tag value being a function of said value of said first global generation counter, said value of said second global generation counter, and said generation tag value associated with said register of said first load; and blocking, by a wait queue, said second load, if said determined generation tag value is more than one generation ahead of said value of said second global generation counter.

20. The computer program product of claim 19, wherein said rollback is triggered upon one of events selected from a group consisting of a misprediction of one of the first and second branch type instructions, a restart of a pipeline in said processor, and a flush of a cache of said processor.

* * * * *